United States Patent [19]

Moore et al.

[11] Patent Number: 4,658,064

[45] Date of Patent: Apr. 14, 1987

[54] P-FORMYL-N,N-DIPOLYOXYALK-YLENESUBSTITUTEDANILINE

[75] Inventors: Patrick D. Moore, Spartanburg; Robert L. Mahaffey, Jr., Inman, both of S.C.

[73] Assignee: Milliken Research Corporation, Spartanburg, S.C.

[21] Appl. No.: 785,627

[22] Filed: Oct. 8, 1985

Related U.S. Application Data

[62] Division of Ser. No. 644,375, Aug. 27, 1984, Pat. No. 4,594,454.

[51] Int. Cl.$^4$ ............................................. C01C 91/40
[52] U.S. Cl. .................................... 564/443; 564/404; 564/405; 564/408; 564/305; 560/252
[58] Field of Search ............... 564/443, 305, 404, 405, 564/408

[56] References Cited

U.S. PATENT DOCUMENTS

| | | | |
|---|---|---|---|
| 2,876,263 | 3/1959 | Mark ................................. | 564/443 |
| 4,378,969 | 4/1983 | Hansen et al. ...................... | 564/443 |
| 4,588,840 | 5/1986 | Gurgiolo ............................ | 564/443 |

FOREIGN PATENT DOCUMENTS 1006787 10/1965 United Kingdom ................ 564/443

Primary Examiner—Paul J. Killos
Attorney, Agent, or Firm—H. William Petry; Terry T. Moyer

[57] ABSTRACT

A compound is provided of the formula:

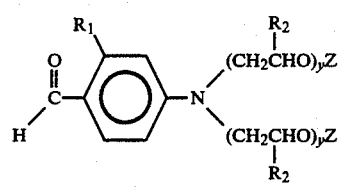

wherein $R_1$ is selected from alkyl, halide, or alkoxy; $R_2$ is selected from H or alkyl; Y is a number of from 2 to about 200; and Z is selected from H or

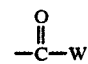

where W is alkyl.

1 Claim, No Drawings

P-FORMYL-N,N-DIPOLYOXYALKYLENESUB-STITUTEDANILINE

This is a division of application Ser. No. 644,375, filed Aug. 27, 1984, now U.S. Pat. No. 4,594,454.

The present invention relates to N,N-disubstitutedaminobenzaldehydes and to a process for the preparation of N,N-disubstitutedaminobenzaldehydes. More particularly, the present invention relates to p-formyl-N,N-dipolyoxyalkylenesubstitutedaniline compounds and to a process for preparing such compounds.

In general, N,N-disubstitutedaminobenzaldehydes are well known chemical compounds having a fairly wide variety of end-use applications including, for instance, their use as intermediates in the preparation of commercial styryl dyes (see *The Cyanine Dyes and Related Compounds,* Hamer (1964), Interscience Publishers (John Wiley & Sons, New York, NY).

The bis(hydroxyalkyl)aminobenzaldehydes and some corresponding styryl dyes are also known as disclosed, for instance, in U.S. Pat. Nos. 3,888,668 and 3,855,210, both issued to Keller and assigned to Itek Corp.

There are, in general, several known methods for preparing N,N-disubstitutedaminobenzaldehydes. One well known method involves the reaction of N,N-disubstitutedaniline and formaldehyde with N,N-disubstituted-p-nitrosoaniline to form the corresponding Schiff base, followed by hydrolysis of the Schiff base with hot, dilute acid. The product may be separated by conventional filtration after the reaction mixture has been neutralized, and the corresponding diamine remaining in the filtrate is normally discarded.

Another known preparation method involves the reaction of phosphorus oxychloride (POCl₃) with dimethylformamide (DMF) followed by reaction with N,N-disubstitutedaniline to form N,N-disubstitutedaminobenzaldehyde. See *Dyes and Their Intermediates,* Abrahart (1977), Edward Arnold Ltd., London.

There are several disadvantages associated with the known methods for preparing N,N-disubstitutedaminobenzaldehydes when applied to the preparation of p-formyl-N,N-dipolyoxyalkylenesubstitutedanilines. As to the Schiff Base Method, there are two ways to apply the Schiff Base Method to prepare p-formyl-N,N-dipolyoxyalkylenesubstitutedanilines. In case one, N,N-dimethyl-p-nitrosoaniline is used to treat an N,N-dipolyoxyalkyleneaniline. Yields reported for this type of process are generally rather low, and the suspected human carcinogen p-amino-N,N-dimethylaniline is produced.

In case two, N,N-dipolyoxyalkyleneaniline is nitrosylated and used to treat N,N-dipolyoxyalkyleneaniline. In this case the polymeric p-amino-N,N-dipolyoxyalkyleneaniline is difficult to separate from the product, is produced in large quantities and is costly to dispose of.

As to the second preparation method described above, typically a large excess of dimethylformamide is required in the reaction mixture to function as a solvent for the reactive POCl₃-dimethylformamide ionic complex that is formed during the reaction prior to the addition of the N,N-disubstitutedaniline to that solution. There are, in addition, processing and apparatus difficulties because the reactor must be cooled and also be capable of stirring the small initial DMF/POCl₃ charge while at the same time it must be capable of accommodating the entire charge, e.g., including the N,N-disubstitutedaniline, that (in the case of N,N-dipolyoxyalkylenesubstitutedaniline) must be added in large volumes because of the stoichiometric requirements for the reaction and its greater molecular weight.

According to the present invention a compound is provided of the formula:

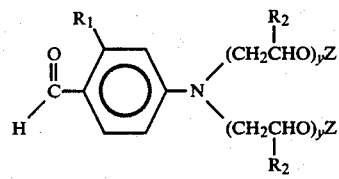

wherein $R_1$ is selected from alkyl, halide, or alkoxy; $R_2$ is selected from H or alkyl; Y is a number of from 2 to about 200; and Z is selected from H or

where W is alkyl.

Due to the solvent power of polyoxyalkylene present in the reactant, it is surprisingly not necessary to use DMF as a solvent. Thus provided according to the present invention is a process for the preparation of p-formyl-N,N-dipolyoxyalkylenesubstitutedaniline which comprises:

(a) forming a solution of dimethylformamide in an N,N-dipolyoxyalkylenesubstitutedanilinediacetate;

(b) adding to said solution a condensing agent selected from phosphorus oxychloride, thionyl chloride, phosphorus trihalide, phosphorus pentahalide, and acyl acid chlorides in an amount sufficient to form p-formyl-N,N-dipolyoxyalkylene-substitutedanilinediacetate from the corresponding N,N-dipolyoxyalkylenesubstitutedanilinediacetate; and (c) hydrolysing said p-formyl-diacetate to form said p-formyl-N,N-dipolyoxyalkylenesubstitutedaniline product.

The products of the present invention may be most generally described by reference to the structural formula set forth above. With regard to embodiments of the present invention the $R_1$ group in the structural formula may be selected from an alkyl group having from one to about two carbon atoms, preferably the alkyl group is methyl. According to another embodiment $R_1$ may be a halide atom, preferably a halide atom selected from chlorine, bromine or iodine. According to yet another embodiment $R_1$ may be an alkoxy group, preferably an alkoxy group containing from about one to about two carbon atoms.

The $R_2$ group in the above structural formula for the compounds of the present invention may be selected from H or an alkyl group having from one to about three, preferably one, carbon atoms.

The Z group in the above structural formula may be selected from H or the group

where W is an alkyl group having from one to about 18 carbon atoms, preferably from one to about four carbon atoms.

The process of the present invention may be further understood by reference to the following detailed description of the process.

An N,N-dipolyoxyalkylenesubstitutedaniline with an unsubstituted para position and sufficiently nonhindered by meta substitution as with hydrogen, chlorine, methoxy, methyl) is mixed with DMF in an amount at least molar equivalent based on substitutedaniline but slight excess, e.g., 1.25-1.5 mole equivalent, is preferred. Large excess may not, however, be detrimental to product yield. This solution may be cooled to 0°-15° C. for retention of best color and to obtain the best yield but the formylation reaction proceeds well without applied cooling. A molar excess of (1.25-1.5) of phosphorus oxychloride ($POCl_3$) or equivalent condensing agent is then added slowly to the solution. This condensing agent reacts first with the DMF forming the active formylating agent that in the presence of the N,N-dipolyoxyalkylenesubstitutedaniline reacts to introduce the incipient formyl group at the para position. Most of the reaction occurs at temperatures of 0°-15° C. over several hours but heating to 90° C. promotes improved final yields.

Depending on the desired application, the product can be purified and treated in several different ways as follows:

(1) Neutralization is accomplished by addition of water and any applicable base such as sodium hydroxide. The products typically separate from the aqueous salt solution as oily liquids. Water soluble products can be isolated by the use of methylene chloride or similar solvents.

(2) In the preferred procedure the N,N-dipolyoxyalkylenesubstitutedaniline is treated with acetic anhydride to produce end groups terminating as acetyl esters. After formylation the acetyl groups can be readily removed by alkaline hydrolysis preferably with KOH or KOH/NaOH mixtures. Base is consumed during the reaction in that at least 2 molar equivalents are used to effect complete hydrolysis (preferably 2.2 equivalents). After hydrolysis any excess base is neutralized with acid, mineral and/or acetic acid. The final product is purified by heating with equal volumes of water and separating the two liquid phases, product and salt solution. After repeated washing with water, the final product may be dehydrated by vacuum distillation of residual water.

The invention may be further understood by reference to the following examples wherein all parts are by weight unless indicated otherwise. The examples are not to be construed as limiting the scope of the invention which is further defined in the appended claim.

PREPARATION A

Preparation of N,N-polyoxyethylenepolyoxypropyleneanilinediacetate 6.04 parts N,N-polyoxyethylenepolyoxypropyleneaniline $$\left(\text{hydroxyl number} = \frac{105 \text{ mg KOH}}{g}\right)$$

was mixed with 0.00014 parts N-methylimidazole, purged with nitrogen and heated to 110° C. 1.0 parts acetic anhydride was then added dropwise over 30 minutes. The reaction was held for two hours at 109°-116° then adapted for distillation. Vacuum was gradually applied to a maximum of 30 mmHg and the pot temperature was raised to 150° C. maximum to give 0.305 parts acetic acid/anhydride and 6.35 parts N,N-polyoxyethylenepolyoxypropyleneanilinediacetate.

PREPARATION B

Preparation N,N-polyoxyethylenepolyoxypropylene-meta-methylanilinediacetate

Five hundred parts of N,N-polyoxyethylenepolyoxypropylene-meta-methylaniline produced from reaction of an average of 7 moles ethylene oxide and 15 moles propylene oxide was mixed with 0.1 part methylimidazole and heated to 110° C. 82.5 parts acetic anhydride was then added over 15 minutes. The reaction mixture was held at 95°-116° C. for 3.75 hours, then acetic acid removed by vacuum distillation to give 516 parts diacetate product.

PREPARATION C

Preparation of N,N-polyoxyethylenepolyoxypropylene-meta-chloroanilinediacetate

Two hundred fifty parts N,N-polyoxyethylenepolyoxypropylene-meta-chloroaniline produced from reaction of an average of 5 moles ethylene oxide and 8 moles propylene oxide was mixed with 0.1 part 1-methyl imidazole and heated to 100° C. Sixty-two parts acetic anhydride was then added. The solution was held at 87°-100° C. for about 3 hours, then acetic acid was removed by vacuum distillation to give 259 parts diacetate product.

PREPARATION D

Preparation of N,N-dipolyoxyethylene-meta-methoxyanilinediacetate

One hundred parts N,N-dipolyoxyethylene-meta-methoxyaniline produced from reaction of an average of 12 moles ethylene oxide was mixed with 0.1 part 1-methyl imidazole and heated to 80°-90° C. Thirty-five parts acetic anhydride was added and the solution held four hours at 78°-130° C., then acetic acid was removed under vacuum to give 100 parts diacetate product.

EXAMPLE I

Preparation of p-formyl-N,N-polyoxyethylenepolyoxypropyleneanilinediacetate via prior art method Two hundred two parts dimethylformamide were placed in a dry, 3-neck flask, purged with nitrogen, and cooled to 0° C. Eighty-four and nine-tenths parts phosphorus oxychloride was then added dropwise with stirring and cooling over 15 minutes. The solution was stirred for about 30 minutes from 0° C.-2° C. Then 500 parts of the N,N-polyoxyethylenepolyoxypropyleneaniline diacetate prepared by Preparation A was added over 30 minutes. The reaction mixture was gradually heated to 90° C., then held at 90° C. for one hour. After cooling the reaction mixture was diluted with an equal amount of ice and then neutralized with 50% NaOH. The organic layer was separated and then washed three times with an equal amount of hot water. The product was dehydrated under reduced pressure to give 450 parts p-formyl-N,N-polyoxyethylenepolyoxypropyleneanilinediacetate (max. 342 nm; $A/_{gl}=20.45$).

EXAMPLE II

Hydrolysis of p-formyl-N,N-polyoxyethylenepolyoxypropyleneanilinediacetate

Four hundred twenty-eight parts p-formyl-N,N-polyoxyethylene-polyoxypropyleneanilinediacetate were mixed with 200 parts water and 41.0 grams of 85% KOH pellets were added. The mixture was heated to between 80° and 90° C. for four hours, cooled and neutralized with HCl. The organic layer was separated and washed twice with equal amounts of hot water. The product was dehydrated under reduced pressure to give 358 parts (max. 342 nm; $A/_{gl}=21.1$).

EXAMPLE III

Preparation of p-formyl-N,N-polyoxyethylenepolyoxypropyleneanilinediacetate

One thousand parts N,N-polyoxyethylenepolyoxypropyleneanilinediacetate prepared by Preparation A and 234 parts dimethylformamide were mixed, purged with $N_2$, and cooled to 0°-10° C. One hundred sixty-nine parts phosphorus oxychloride was then added slowly over 20 minutes with cooling. The mixture was stirred one hour, gradually heated to 90° C., and held at 90° C. for 2.5 hours. The mixture was cooled, diluted with an equal amount of water and then neutralized with 50% sodium hydroxide. The organic layer was separated, washed twice with hot water, and dried under reduced vacuum to give 885 parts p-formyl-N,N-polyoxyethylenepropylenediacetate (max. 342 NM; $A/_{g/l}=21.1$). After hydrolysis using 94 parts 50% sodium hydroxide, 8.3 parts 85% potassium hydroxide, and 319 parts water at 90° C., the product was isolated as described previously to give 719 parts p-formyl-N,N-polyoxyethylenepolyoxypropyleneaniline (max. 342 NM; $A/_{g/l}=21.8$).

EXAMPLE IV

Preparation of p-formyl-N,N-dipolyoxyethylene-meta-methoxyanilinediacetate

One hundred parts N,N-dipolyoxyethylene-meta-methoxyanilinediacetate prepared above was mixed with 28 parts dimethylformamide and cooled to 8° C. Thirty-five parts phosphorus oxychloride was then added dropwise with cooling to maintain less than 15° C. The reaction was stirred one hour, then heated 50° C. over 30 minutes and to 95° C. over 50 minutes. The reaction mixture was cooled, diluted with equal water and neutralized with 50% NaOH. One hundred grams methylene chloride as added to dissolve product. The methylene chloride was separated and washed with two additional equal volumes of water to give after removal of solvent under vacuum 82 parts product $A_{max/g/l}=28.3$.

EXAMPLE V

Preparation of p-formyl-N,N-polyoxyethylene-polyoxypropylene-meta-methylanilinediacetate One hundred parts N,N-polyoxyethylenepolyoxypropylene-meta-methylanilinediacetate prepared above was mixed with 20 parts dimethylformamide and cooled to 20° C. Sixteen and eight tenths parts phosphorus oxychloride was added dropwise over 10 minutes. The reaction was stirred 30 minutes, then heated to 50° C.; held 15 minutes, then heated to 90° C. The reaction was held 15 minutes, then cooled, diluted with ice and water and neutralized with 50% sodium hydroxide. The product separates as an oil and was washed three times with equal water. $A_{max/g/l}=19.5$, 74 parts final yield.

EXAMPLE VI

Preparation of p-formyl-N,N-polyoxyethylenepolyoxypropylene-meta-chloroanilinediacetate Two hundred fifty-nine parts of N,N-polyoxyethylenepolyoxypropylene-meta-chloroanilinediacetate prepared above was mixed with 48 parts dimethylformamide and cooled to 4° C. Fifty-nine and three tenths parts phosphorus oxychloride was then added over 30 minutes with cooling to maintain temperature less than 11° C. The reaction was stirred 30 minutes, heated to 50° C., held 45 minutes; then heated to 90°-94° C., and held 2.5 hours. The product was cooled, diluted with ice and water; then neutralized with 50% sodium hydroxide. The product separates as an oil and was washed three times with equal water to give a 202 parts product $A_{max/g/l}=22.8$.

What is claimed is:

1. A process is provided for the preparation of p-formyl-N,N-dipolyoxyalkylenesubstitutedaniline which comprises:
   (a) forming a solution of dimethylformamide in an N,N-dipolyoxyalkylenesubstitutedaniline;
   (b) adding to said solution a condensing agent selected from phosphorus oxychloride, thionyl chloride, phosphorus trihalide, phosphorus pentahalide, and acyl acid chlorides in an amount sufficient to form p-formyl-N,N-dipolyoxyalkylenesubstitutedanilinediacetate from the corresponding N,N-dipolyoxyalkylenesubstitutedanilinediacetate; and
   (c) hydrolysing said p-formyl-diacetate to form said p-formyl-N,N-dipolyoxyalkylenesubstitutedaniline product.

* * * * *